2,860,132
Patented Nov. 11, 1958

2,860,132

PRODUCTION OF ORGANIC ESTERS OF CELLULOSE BY HETEROGENEOUS ESTERIFICATION

Blanche B. White, New Providence, and Charles L. Smart, Millington, N. J., assignors to Celanese Corporation of America, New York, N. Y., a corporation of Delaware No Drawing. Application November 1, 1955
Serial No. 544,355

6 Claims. (Cl. 260—227)

This invention relates to the production of organic acid esters of cellulose and relates more particularly to an improved process for the production of organic acid esters of cellulose by heterogeneous esterification.

In the production of organic acid esters of cellulose by heterogeneous esterification of cellulosic materials such as cellulose, itself, or an organic acid ester of cellulose containing free hydroxyl groups, the cellulosic material is esterified with an organic acid anhydride in the presence of an esterification catalyst and a sufficient quantity of a non-solvent diluent to prevent the solution of the organic acid ester of cellulose in the esterification medium. Following the completion of the esterification, it is necessary to remove from the organic acid ester of cellulose substantially all traces of the esterification medium and particularly of the esterification catalyst. Unless this is done, the organic acid ester of cellulose will have a poor stability, especially at elevated temperatures. In the interests of economy, it is desirable to remove the esterification medium from the organic acid ester of cellulose in such a manner that it may be reused for the esterification of additional quantities of cellulose after a minimum number of treatment steps.

It is an important object of this invention to provide a process for the production of organic acid esters of cellulose by heterogeneous esterification which will fulfill the foregoing requirements and which will be especially simple and efficient in operation.

A further object of this invention is to provide, in a process for the production of organic acid esters of cellulose by heterogeneous esterification, a novel method for the substantially complete removal of esterification medium from the organic acid ester of cellulose.

Another object of this invention is to provide, in a process for the production of organic acid esters of cellulose by heterogeneous esterification, a novel method for the removal of the esterification medium from organic acid ester of cellulose in such a manner that the esterification medium may be reused for the esterification of further quantities of cellulose after a minimum number of treatment steps.

Other objects of this invention will be apparent from the following detailed description and claims.

According to the present invention, cellulosic material, after a suitable pretreatment to increase its reactivity, if desired, is esterified with an esterification medium containing an organic acid anhydride, an acid esterification catalyst and a sufficient quantity of a non-solvent diluent to prevent the solution of the organic acid ester of cellulose in the said medium. When the esterification is complete, as much as possible of the esterification medium is physically separated from the organic acid ester of cellulose by draining, centrifuging, pressing or the like. The organic acid ester of cellulose is then washed with a quantity of a non-aqueous non-solvent for the organic acid ester of cellulose to remove therefrom a further quantity of the esterification medium. Next, the organic acid ester of cellulose is washed with water having dissolved therein an alkaline-reacting material. Finally, the organic acid ester of cellulose is washed with water and may, if desired, be dried. The product obtained in this manner is substantially free from impurities that will reduce its stability. In addition, the bulk of the esterification medium is recovered in such form that it may readily be put in condition for reuse after a minimum number of treatment steps.

In carrying out this invention, there may be employed as a starting material any cellulosic material containing free hydroxyl groups. For example, there may be employed a highly purified cellulose which may be derived from cotton linters, wood pulp or any other desired source. There may also be employed as the starting material filamentary materials of cellulose prepared, for example, by the viscose or cuprammonium process or by the hydrolysis of filamentary materials of organic acid esters of cellulose. Another suitable starting material is an organic acid ester of cellulose containing free hydroxyl groups, which material may, if desired, be in the form of filaments, or the like. If desired, the cellulosic material may be pretreated to increase its reactivity and thereby shorten the esterification time. For example, the cellulosic material may be treated, in one or more stages, with a lower aliphatic acid, such as formic, acetic, propionic or butyric acid, or mixtures of the same.

Following the pretreatment, if one is employed, the cellulosic material is esterified with an esterification medium containing an organic acid anhydride corresponding to the ester to be formed, an acid-reacting esterification catalyst and a non-aqueous, non-solvent diluent in an amount sufficient to prevent the solution of the organic acid ester of cellulose. Examples of suitable esterification catalysts are perchloric acid, sulfuric acid, toluene sulfonic acid, methionic acid and boron trifluoride. The amount of the esterification catalyst will normally range between 0.5 and 15% by weight, based on the weight of the cellulosic material. Non-solvent, non-aqueous diluents that may be employed in carrying out this process include, for example, hydrocarbons such as benzene, cyclohexane, toluene, xylene, hexane, Varsol-1 (an aliphatic solvent having a boiling range from 305–410° F.) and Solvesso 150 (a 100% aromatic solvent having a boiling range of from 365 to 415° F.). Other non-solvent, non-aqueous diluents that may be employed are carbon tetrachloride, isopropyl acetate, N-propyl acetate and butyl acetate. The quantity of non-solvent diluent present in the esterification medium may vary over a wide range, say from 800 to 2000 parts for each 100 parts by weight of the cellulosic material present. The esterification is normally carried out at temperatures between 25 and 60° C., and will be completed in from as little as 2 minutes, or less, to as much as 4 hours, or more, depending upon the nature of the cellulosic material being esterified and the conditions employed during the pretreatment and esterification.

Following the completion of the esterification, the esterification medium and the organic acid ester of cellulose are physically separated from one another as completely as possible. Such separation may be carried out by draining, centrifuging, pressing, or the like, or by any combination of such steps. The esterification medium recovered in this manner may be readily reconditioned for further use in the esterification of further quantities of cellulose. One method of effecting such reconditioning is to convert the organic acid in said medium, which is formed during the esterification of the cellulose, to the corresponding anhydride by reaction with a ketene. Preferably, the qauntity of ketene employed is less than that theoretically required to convert all the organic acid to anhydride so as to minimize the buildup of color-forming bodies in the medium. Additional catalyst is added to the medium to restore its concentration to the original value. Also, the concentration of the non-solvent, non-aqueous diluent is adjusted to the desired level. If desired, the reconditioned esterification medium may be treated with a decolorizing agent, such as activated charcoal, to remove any color-forming bodies that may be present therein.

The organic acid ester of cellulose is then washed, in one or more stages, with a non-aqueous non-solvent for the organic acid ester of cellulose, preferably the same material as is employed as the diluent in the esterification medium. The volume of non-solvent employed for this purpose is not critical and may range from 5800 to 14,500 parts by weight for each 100 parts of cellulosic material originally employed. The washing may be carried out on a batch basis or in a continuous manner employing concurrent or countercurrent flow of the organic acid ester of cellulose and the non-solvent. The washings from this step may be employed for the preparation of further quantities of esterification medium, after treatment with a ketene, if desired, thereby effectively making use of the organic acid and organic acid anhydride present therein.

At this point in the process, although the major portion of the esterification medium has been removed from the organic acid ester of cellulose, a sufficient proportion of such medium, and particulary of the esterification catalyst of such medium, remains in the said ester to impair the stability thereof. Attempts to remove the residual esterification medium by washing with further quantities of non-aqueous non-solvent or by washing with water are relatively ineffective since the said medium appears to be absorbed in or adsorbed on the organic acid ester of cellulose. In addition, such further washing, to be even partially effective, would require prohibitively large volumes of wash liquid.

To remove the residual esterification medium in accordance with the process of this invention, which is effected in an efficient and highly economical manner, the organic acid ester of cellulose is washed with water having dissolved therein an alkaline-reacting material. Examples of suitable alkaline reacting materials that may be employed for this purpose are the alkaline-reacting salts of a strong base and a weak acid, such as sodium, potassium or lithium acetates, propionates, butyrates and the like. There may also be employed alkaline-reacting salts of alkaline earth metals such as magnesium or calcium acetates, propionates, butyrates and the like. Another group of suitable alkaline-reacting materials are the nitrogenous bases such as ammonia, pyridine, alkylamines and the like. The quantity of alkaline-reacting material should be sufficient to react with all the esterification catalyst remaining in the organic acid ester of cellulose and, preferably, there should be employed at least a 200% molar excess over that required for this purpose. The concentration of the alkaline-reacting material in the wash water may range between about 0.5 and 1.0% by weight. For each 100 parts by weight of cellulose, there should be employed between about 7,000 and 10,500 parts by weight of wash water. The temperature of the wash liquid may range between 50 and 90° C. This wash liquid may be discarded since its content of organic materials is small. However, if economically desirable, it may be readily treated to recover the non-solvent diluent or other materials present therein.

The organic acid ester of cellulose is next washed with sufficient water to remove therefrom the residue of alkaline-reacting material remaining therein from the previous washing step. Normally, there should be employed between about 7,000 and 42,000 parts of water per each 100 parts by weight of cellulosic material. Finally, if desired, the wet organic acid ester of cellulose may be dried in accordance with the usual practice in the art.

The process of this invention will now be described specifically in connection with the production of cellulose acetate which is commercially the most important organic acid ester of cellulose at the present time. However, it may also be employed for the production of other organic acid esters of cellulose, such as, for example, cellulose propionate, cellulose butyrate, cellulose acetate formate, cellulose acetate propionate and cellulose acetate butyrate.

*Example I*

A skein of cellulose acetate multifilament yarn of 2000 denier having an acetyl value of 53.5% by weight, calculated as acetic acid, and containing 21 parts by weight of the yarn is mixed with 387 parts by weight of an esterification medium having a temperature of 60° C. and containing by weight 91.0% of benzene, 8.26% of acetic anhydride, 0.52% of acetic acid and 0.23% of sulfuric acid. After 5 minutes, the yarn is removed from the esterification medium and drained for 30 seconds in a perforated metal basket. The yarn is then washed twice with benzene, each time for 1 minute employing 433 parts of benzene at a temperature of 60° C. and drained. The yarn is next washed three times with a 0.8% by weight solution of ammonia in water, each time for 1 minute employing 500 parts by weight of solution at a temperature of 90° C. and drained. Finally, the yarn is washed twice with water, each time for 1 minute employing 500 parts by weight of water at a temperature of 90° C., drained and dried. The yarn obtained has an acetyl value of 62.0% by weight, calculated as acetic acid, and is highly stable.

*Example II*

Cellulose acetate yarn is acetylated in the same manner as described in Example I, drained and washed twice with benzene in the manner described in the Example I. The yarn is then washed for 1 minute with 500 parts by weight of water at a temperature of 90° C. The yarn is next washed three times with a 0.8% by weight solution of ammonia in water, each time for 1 minute employing 500 parts by weight of solution at a temperature of 90° C. and drained. Finally, the yarn is washed twice with water, each time for 1 minute employing 500 parts by weight of water at a temperature of 90° C., drained and dried. The yarn obtained has an acetyl value of 62.0% by weight, calculated as acetic acid, and is highly stable.

*Example III*

Cellulose acetate yarn is acetylated in the same manner as described in Example I, drained and washed twice with benzene in the manner described in the Example I. The yarn is then washed for 1 minute with 500 parts by weight of water at a temperature of 90° C. The yarn is next washed three times with a 0.4% by weight solution of magnesium acetate in water, each time for 1 minute employing 500 parts by weight of solution at a temperature of 90° C. Finally, the yarn is washed for 1 minute with 500 parts by weight of water at a temperature of 90° C., drained and dried. The yarn obtained is highly stable.

It is to be understood that the foregoing detailed description is given merely by way of illustration and that many variations may be made therein without departing from the spirit of our invention.

Having described our invention what we desire to secure by Letters Patent is:

1. Process for the production of organic acid esters of cellulose of an organic acid containing at most four carbon atoms by heterogeneous esterification, which comprises esterifying a cellulosic material with an esterification medium containing an organic acid anhydride of an organic acid containing at most four carbon atoms, an acid esterification catalyst and a non-aqueous, non-solvent diluent in an amount sufficient to prevent solution of the organic acid ester of cellulose, washing the organic acid ester of cellulose with a non-aqueous non-solvent for the organic acid ester of cellulose, washing the organic acid ester of cellulose with an aqueous solution of an alkaline-reacting material, and washing the organic acid ester of cellulose with water.

2. In a process for the production of organic acid esters of cellulose of an organic acid containing at most four carbon atoms by heterogeneous esterification wherein a cellulosic material is esterified with an esterification medium containing an organic acid anhydride of an organic acid containing at most four carbon atoms, an acid esterification catalyst and a non-aqueous, non-solvent diluent in an amount sufficient to prevent solution of the organic acid ester of cellulose, the steps which comprise separating the major portion of the esterification medium from the organic acid ester of cellulose, washing the organic acid ester of cellulose with a non-aqueous non-solvent for the organic acid ester of cellulose, washing the organic acid ester of cellulose with an aqueous solution of an alkaline reacting material, and washing the organic acid ester of cellulose with water.

3. In a process for the production of organic acid esters of cellulose of an organic acid containing at most four carbon atoms by heterogeneous esterification wherein a cellulosic material is esterified with an esterification medium containing an organic acid anhydride of an organic acid containing at most four carbon atoms, an acid esterification catalyst and a non-aqueous, non-solvent diluent in an amount sufficient to prevent solution of the organic acid ester of cellulose, the steps which comprise separating the major portion of the esterification medium from the organic acid ester of cellulose, washing the organic acid ester of cellulose with, for each 100 parts by weight of cellulosic material, 5,800 to 14,500 parts by weight of a non-aqueous non-solvent for the organic acid ester of cellulose, washing the organic acid ester of cellulose with, for each 100 parts by weight of cellulosic material, 7,000 to 10,500 parts by weight of an aqueous solution of an alkaline reacting material, the alkaline material being employed in an amount at least sufficient to react with all the esterification catalyst present in the organic acid ester of cellulose, and washing the organic acid ester of cellulose with, for each 100 parts by weight of cellulosic material, 7,000 to 42,000 parts by weight of water.

4. In a process for the production of cellulose acetate by heterogeneous esterification wherein a cellulosic material is esterified with an esterification medium containing acetic anhydride, an acid esterification catalyst and a nonaqueous, non-solvent diluent in an amount sufficient to prevent solution of the cellulose acetate, the steps which comprise washing the cellulose acetate with a non-aqueous non-solvent for the cellulose acetate, washing the cellulose acetate with an aqueous solution of an alkaline reacting material, and washing the cellulose acetate with water.

5. In a process for the production of cellulose acetate by heterogeneous esterification wherein a cellulosic material is esterified with an esterification medium containing acetic anhydride, an acid esterification catalyst and a non-aqueous, non-solvent diluent in an amount sufficient to prevent solution of the cellulose acetate, the steps which comprise separating the major portion of the esterification medium from the cellulose acetate, washing the cellulose acetate with, for each 100 parts by weight of cellulosic material, 5,800 to 14,500 parts by weight of a non-aqueous, non-solvent for the cellulose acetate, washing the cellulose acetate with, for each 100 parts by weight of cellulosic material, 7,000 to 10,500 parts by weight of an aqueous solution of an alkaline reacting material, and washing the cellulose acetate with, for each 100 parts by weight of cellulosic material, 7,000 to 42,000 parts by weight of water.

6. In a process for the production of cellulose acetate by heterogeneous esterification wherein a cellulosic material is esterified with an esterification medium containing acetic anhydride, sulfuric acid and benzene in an amount sufficient to prevent solution of the cellulose acetate, the steps which comprise separating the major portion of the esterification medium from the cellulose acetate, washing the cellulose acetate with benzene, washing the cellulose acetate with an aqueous solution of ammonia, and washing the cellulose acetate with water.

References Cited in the file of this patent
UNITED STATES PATENTS 2,607,771  Groombridge et al. _____ Aug. 19, 1952